(12) United States Patent
Kapavik

(10) Patent No.: US 10,736,404 B2
(45) Date of Patent: Aug. 11, 2020

(54) PRINTED MEDIA DISPLAY AND HOLDER

(71) Applicant: Daniel Kapavik, Washington, DC (US)

(72) Inventor: Daniel Kapavik, Washington, DC (US)

(*) Notice: Subject to any disclaimer, the term of this patent is extended or adjusted under 35 U.S.C. 154(b) by 293 days.

(21) Appl. No.: 15/722,215

(22) Filed: Oct. 2, 2017

(65) Prior Publication Data

US 2018/0146770 A1 May 31, 2018

Related U.S. Application Data

(60) Provisional application No. 62/427,317, filed on Nov. 29, 2016.

(51) Int. Cl.
| | |
|---|---|
| *A45C 11/34* | (2006.01) |
| *B42F 7/02* | (2006.01) |
| *A45F 3/50* | (2006.01) |
| *B42F 7/06* | (2006.01) |
| *G09B 29/00* | (2006.01) |
| *G09B 29/04* | (2006.01) |

(52) U.S. Cl.
CPC .............. *A45F 3/50* (2013.01); *A45C 11/34* (2013.01); *B42F 7/025* (2013.01); *B42F 7/065* (2013.01); *B42P 2241/02* (2013.01); *B42P 2241/06* (2013.01); *B42P 2241/20* (2013.01); *G09B 29/003* (2013.01); *G09B 29/04* (2013.01)

(58) Field of Classification Search
CPC ................................. A45C 11/34; B42F 7/025
USPC .......................... 224/191; 206/320; 150/105
See application file for complete search history.

(56) References Cited

U.S. PATENT DOCUMENTS

| | | |
|---|---|---|
| 596,300 A | 12/1897 | Lee |
| 1,712,088 A | 5/1929 | Mellin |
| 1,730,790 A | 10/1929 | Squires |
| 1,836,154 A * | 12/1931 | Cobbs ....................... B60R 7/04 |
| | | 40/644 |
| 2,791,040 A | 5/1957 | Santorelli |
| 2,889,638 A | 6/1959 | Anderson |
| 3,065,668 A | 11/1962 | Leybourn et al. |
| 3,553,864 A | 1/1971 | Karlyn et al. |
| 3,608,219 A | 9/1971 | Verebay |
| 3,791,314 A * | 2/1974 | Berretta ............... A47B 23/002 |
| | | 108/43 |
| 3,808,415 A | 4/1974 | Hurst |
| 4,443,198 A | 4/1984 | Ehsanipour |
| 4,530,175 A | 7/1985 | Wellman |
| 4,641,440 A * | 2/1987 | Agranov ................ G09B 29/10 |
| | | 40/110 |
| 4,800,664 A | 1/1989 | Marstall |
| 4,810,544 A * | 3/1989 | Hickman ................. B42D 1/10 |
| | | 229/67.1 |
| D300,786 S | 4/1989 | Josselyn |
| 4,828,151 A | 5/1989 | Goss |
| 4,998,185 A | 3/1991 | DeNigris, Jr. |

(Continued)

*Primary Examiner* — Nathan J Newhouse
*Assistant Examiner* — Lester L Vanterpool
(74) *Attorney, Agent, or Firm* — Womble Bond Dickinson (US) LLP

(57) ABSTRACT

A holder for displaying printed media is described. The holder includes a rigid, transparent, non-porous cover plate, and a fabric-covered backing board. The backing board has a planar surface for supporting the cover plate and a plurality of straps located along a periphery of the planar surface. The cover plate has fastener portions configured to mate with the straps of the backing board to secure the cover plate to the backing board.

20 Claims, 8 Drawing Sheets

(56) References Cited

U.S. PATENT DOCUMENTS

| | | | |
|---|---|---|---|
| 4,998,752 A | 3/1991 | Judson | |
| 5,007,192 A | 4/1991 | Hochberg | |
| D317,788 S | 6/1991 | DeWitt | |
| 5,029,899 A | 7/1991 | Schieppati et al. | |
| 5,044,588 A | 9/1991 | Gunter | |
| 5,110,295 A * | 5/1992 | Concra | B43L 1/00 434/368 |
| 5,114,061 A | 5/1992 | Brady | |
| 5,170,917 A | 12/1992 | Tourigny | |
| 5,178,311 A | 1/1993 | McBride | |
| 5,244,136 A | 9/1993 | Collaso | |
| 5,329,324 A * | 7/1994 | Candido | B42F 7/025 353/120 |
| 5,332,093 A * | 7/1994 | Littlepage | A45C 7/0095 190/102 |
| 5,351,992 A | 10/1994 | Chilson et al. | |
| 5,414,946 A * | 5/1995 | Leon | A47G 1/143 40/353 |
| 5,472,239 A | 12/1995 | Trujillo | |
| 5,599,189 A | 2/1997 | Kees | |
| 5,732,978 A * | 3/1998 | Tunnell, IV | G09B 29/004 283/34 |
| 5,758,751 A * | 6/1998 | Charles | A45C 7/0036 190/107 |
| 5,775,497 A * | 7/1998 | Krulik | A45C 13/002 190/102 |
| 5,884,338 A | 3/1999 | Golde | |
| 5,887,902 A | 3/1999 | Irwin et al. | |
| 6,029,889 A | 2/2000 | Whalen, Jr. et al. | |
| 6,173,837 B1 * | 1/2001 | Marconi | A45C 3/08 190/125 |
| 6,305,590 B1 | 10/2001 | Hayes | |
| 6,415,138 B2 * | 7/2002 | Sirola | G06F 1/1626 345/173 |
| 6,435,392 B1 | 8/2002 | Kennedy | |
| 7,159,630 B1 | 1/2007 | Klatte-Rolfe | |
| 7,255,566 B2 | 8/2007 | Coates | |
| 7,270,255 B2 * | 9/2007 | Badillo | A45C 9/00 224/191 |
| 7,609,512 B2 * | 10/2009 | Richardson | G06F 1/1626 361/679.41 |
| 7,735,644 B2 * | 6/2010 | Sirichai | A45F 5/02 206/320 |
| 7,907,394 B2 * | 3/2011 | Richardson | G06F 1/1613 312/223.1 |
| 8,256,619 B2 * | 9/2012 | Lebauer | A45C 11/00 206/45.26 |
| 8,503,170 B1 * | 8/2013 | Hsu | G06F 1/1626 206/320 |
| 8,643,670 B2 | 2/2014 | Tunnell | |
| 8,789,731 B2 * | 7/2014 | Hart | A45C 13/02 224/197 |
| 9,066,574 B2 * | 6/2015 | Cox | A45F 5/00 |
| 9,261,912 B2 * | 2/2016 | Bell | G06F 1/1637 |
| 9,264,089 B2 * | 2/2016 | Tages | H04B 1/3888 |
| 9,642,425 B2 * | 5/2017 | Tseng | A45C 11/00 |
| 9,867,438 B2 * | 1/2018 | Balourdet | A45C 13/008 |
| 10,070,709 B1 * | 9/2018 | Polins | A45C 13/08 |
| 10,348,354 B1 * | 7/2019 | Balourdet | H04B 1/3888 |
| 2004/0174269 A1 | 9/2004 | Miller et al. | |
| 2005/0011920 A1 * | 1/2005 | Feng | B60R 11/0252 224/275 |
| 2005/0199715 A1 * | 9/2005 | Reid | A45F 5/02 235/384 |
| 2005/0274631 A1 | 12/2005 | Martin | |
| 2006/0208023 A1 | 9/2006 | Manning | |
| 2007/0215501 A1 * | 9/2007 | Hanson | A47G 27/0406 206/320 |
| 2007/0215663 A1 * | 9/2007 | Chongson | A45C 1/04 224/650 |
| 2009/0107878 A1 * | 4/2009 | Daley, III | A45C 5/02 206/576 |
| 2009/0321490 A1 * | 12/2009 | Groene | A45C 11/00 224/576 |
| 2010/0170125 A1 * | 7/2010 | Taylor | G09B 19/00 40/661 |
| 2010/0294683 A1 * | 11/2010 | Mish | A45C 11/00 206/320 |
| 2011/0272305 A1 * | 11/2011 | Lee | A45C 5/03 206/320 |
| 2012/0241059 A1 * | 9/2012 | Wilson | A45C 13/08 150/105 |
| 2013/0001107 A1 * | 1/2013 | Armstrong | A45F 5/00 206/216 |
| 2013/0126372 A1 * | 5/2013 | Song | H04M 1/185 206/320 |
| 2013/0294712 A1 * | 11/2013 | Seuk | A45F 3/04 383/117 |
| 2013/0306206 A1 * | 11/2013 | Quinnan | A45C 13/08 150/105 |
| 2014/0051480 A1 * | 2/2014 | Cruz | H04B 1/3838 455/566 |
| 2014/0066142 A1 * | 3/2014 | Gipson | H04B 1/3888 455/575.8 |
| 2014/0084035 A1 * | 3/2014 | Georges | A45F 5/00 224/267 |
| 2014/0131237 A1 * | 5/2014 | Nadalet | B65D 85/804 206/320 |
| 2014/0353201 A1 * | 12/2014 | Molineux | B65D 33/00 206/524.3 |
| 2015/0265018 A1 * | 9/2015 | Balourdet | A45C 13/008 455/575.8 |

\* cited by examiner

PRINTED MEDIA DISPLAY AND HOLDER

FIELD OF THE DISCLOSURE

The present disclosure relates to holders and cases for displaying and protecting maps and other printed media.

BACKGROUND

Military missions and emergency responses often lead to situations and locations where electronic data and communication is either unavailable or dangerous to transmit. As a result, soldiers and first responders continue to rely upon printed media, such as navigational maps or charts, while in the field. Often, the information provided by the printed media must be accessed under adverse conditions that include multitasking within moving vehicles or outdoor environments that can include heavy rain or blowing sand.

Several attempts have been made to develop products that protect and display printed media. These products seek to allow the user to access information without having to unfold a map or refer to a stored document or paper template. Each of the existing products, however, has one or more characteristics that can be improved.

For example, envelope-type map pouches are flexible so they can be rolled or folded into compact configurations for transport. Flexible map pouches alone, however, do not readily permit marking or writing on the pouch when a table is not available to support the pouch. Even when a solid support is available, attempting to write on a flexible surface layer can cause the marked surface to shift relative to the printed media inside the pouch.

Other map display apparatuses have hard surfaces sandwiching the printed media. These hard surfaces may provide improved writing surfaces, but these rigid devices typically require being folded and unfolded to protect and display the printed material contained within. These rigid holders are often limited in their employment by their solid structure and rigid composition.

Therefore, there remains an opportunity to further improve upon existing printed media display and storage products.

SUMMARY

An embodiment of the present disclosure includes a holder for displaying printed media. The holder comprises a rigid, transparent, non-porous cover plate, and a fabric-covered backing board. The backing board has a planar surface for supporting the cover plate and a plurality of straps located along a periphery of the planar surface. The cover plate comprises fastener portions selected from the group comprising a plurality of snap fastener studs, a plurality of snap fastener sockets, a plurality of loop fastener portions, or a plurality of hook fastener portions, such that the fastener portions are configured to mate with the straps of the backing board to secure the cover plate to the backing board.

Another embodiment of the present disclosure includes a holder for displaying printed media. The holder comprises a rigid, transparent, non-porous cover plate comprising a plurality of fastener portions. The holder also comprises a backing board, the backing board having a planar surface for supporting the cover plate, and a plurality of straps disposed along a periphery of the planar surface. The holder further comprises at least one substantially waterproof flexible pouch. The pouch has a resealable closure along at least a portion of at least one side of the pouch. The pouch further comprises tabs spaced along opposite side edges of the pouch, with each tab having an aperture. The pouch is configured to be positioned between the planar surface of the backing board and the cover plate. The plurality of straps of the backing board are configured to extend through the apertures in respective tabs of the pouch to align the pouch with the planar surface. The straps are configured to secure the cover plate to the backing board with the fastener portions.

These and other aspects of the present invention will become apparent to those skilled in the art after a reading of the following description of the preferred embodiments, when considered in conjunction with the drawings. It should be understood that both the foregoing general description and the following detailed description are explanatory only and are not restrictive of the invention as claimed.

DETAILED DESCRIPTION

Exemplary embodiments of this disclosure are described below and illustrated in the accompanying figures, in which like numerals refer to like parts throughout the several views. The embodiments described provide examples and should not be interpreted as limiting the scope of the invention. Other embodiments, and modifications and improvements of the described embodiments, will occur to those skilled in the art and all such other embodiments, modifications and improvements are within the scope of the present invention. Features from one embodiment or aspect may be combined with features from any other embodiment or aspect in any appropriate combination. For example, any individual or collective features of method aspects or embodiments may be applied to apparatus, product or component aspects or embodiments and vice versa.

Embodiments of the present disclosure provide a holder for displaying, protecting, and facilitating the application of non-permanent markings relative to maps and other printed media. In a preferred embodiment, the apparatus displays printed media as well as optionally stores and organizes at least one of writing instruments, documents, and other items within external storage pockets or internal storage compartments. The embodiments of the present disclosure have sufficient rigidity to provide stability while viewing maps and other documents while in motion.

The embodiments of the present disclosure enable airplane pilots, military personnel, first responders, sport vehicle drivers, and others to view maps and documents using a sturdy and durable holder, i.e. a display board. Embodiments of the present disclosure seek to combine rigidity, transparency, and protection from the elements, into an efficient package by securing a transparent cover plate to a backing board with a plurality of straps. The straps help compress the printed media and optional waterproof pouch between the rigid plate and backing board.

Figure 1:
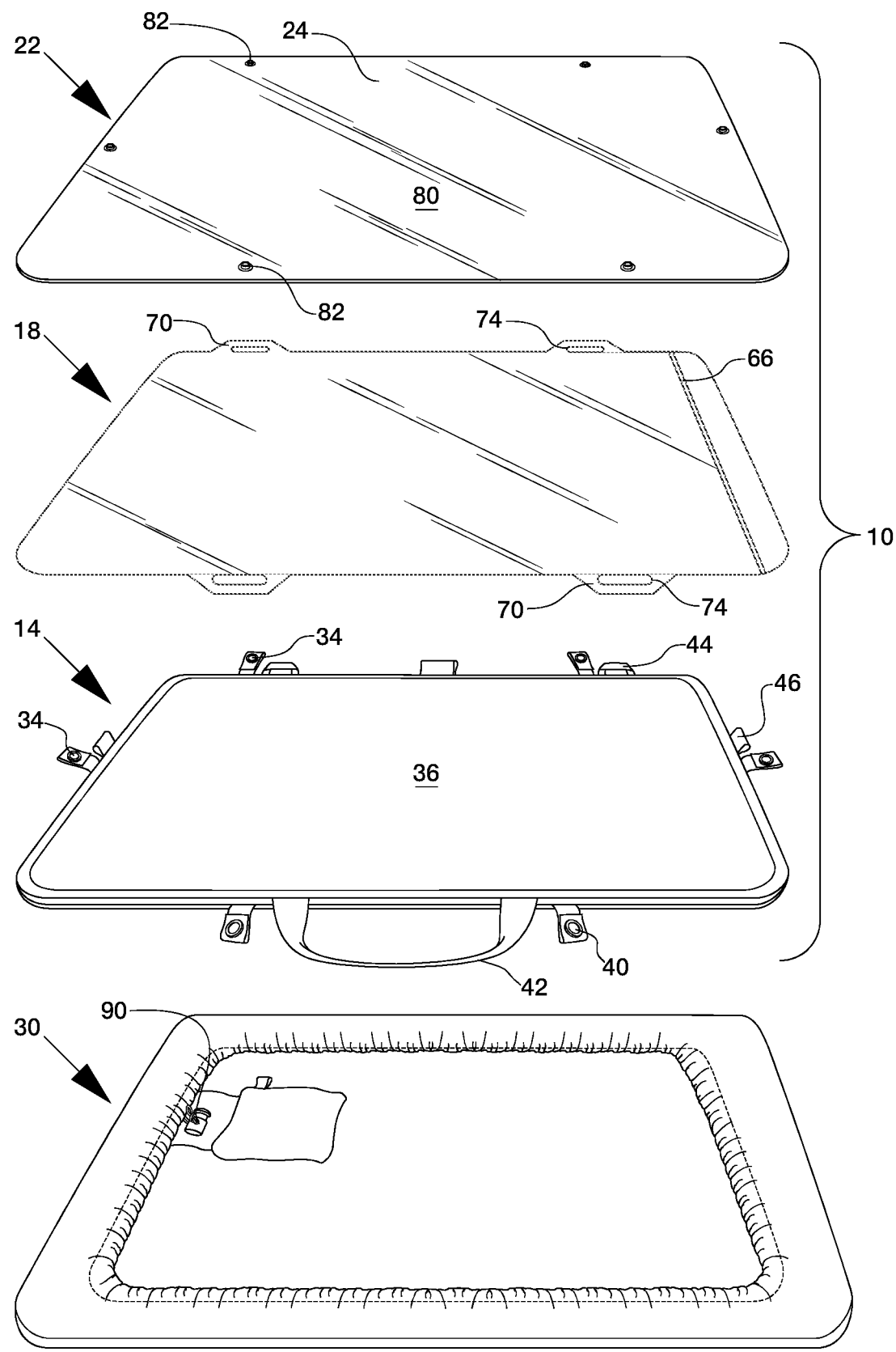
FIG. 1 is an exploded perspective view of a holder according to a first embodiment of the present disclosure.

FIG. 1 shows an exploded view of components of a holder 10 according to a first embodiment. The holder 10 includes a backing board 14 made from durable material, a pouch 18 configured to be at least partially flexible, for receiving printed media (not shown), and a substantially rigid cover plate 22 forming a top surface 24 for receiving writing. An optional cover 30 may be provided to protect the holder 10 from the elements, such as rain. The combined rigid cover plate 22, the middle flexible pouch 18, and the bottom backing board 14 attach together using straps 34 on the backing board to attach the components of the holder 10 together for displaying and protecting documents, maps, and the other printed media.

The backing board 14 may be rigid or semi-rigid. The backing board 14 is preferable substantially covered in durable fabric made from materials such as nylon, aramid, modacrylic, or the like. The fabric covering may enclose a thermoformed polymer core to provide the desired rigidity to the backing board 14. In some embodiments, the backing board 14 comprises a thermoformed polymer sheet and omits the durable fabric covering.

An upper surface 36 of the backing board 14 has a substantially planar surface suitable for supporting the pouch 18 and the cover plate 22. A plurality of straps 34 can be attached around the periphery of the upper surface 36. In one embodiment, the straps 34 are flexible but substantially inelastic. The straps 34 may be fitted with fastener portions such as the illustrated snap fastener sockets 40. Alternatively, the fastener portions associated with the straps 34 may be snap fastener studs, or either portions of a hook and loop type fastener. Other releasable fastening constructions known in the art are also possible. The straps 34 can be permanently sewn to the backing board 14 in the illustrated embodiment, but in other embodiments, the straps 34 may be releasably mounted to the backing board 14.

As shown in FIG. 1, an optional carry handle 42 may be attached to the backing board 14. One or more optional textile loops 44 may also be provided around the periphery of the upper surface 36. The textile loops 44 may be located adjacent to but offset from the straps 34. Retainers 46 for writing implements, such as pens, pencils, or markers may also be sewn along the periphery of the upper surface 36.

Figure 2:
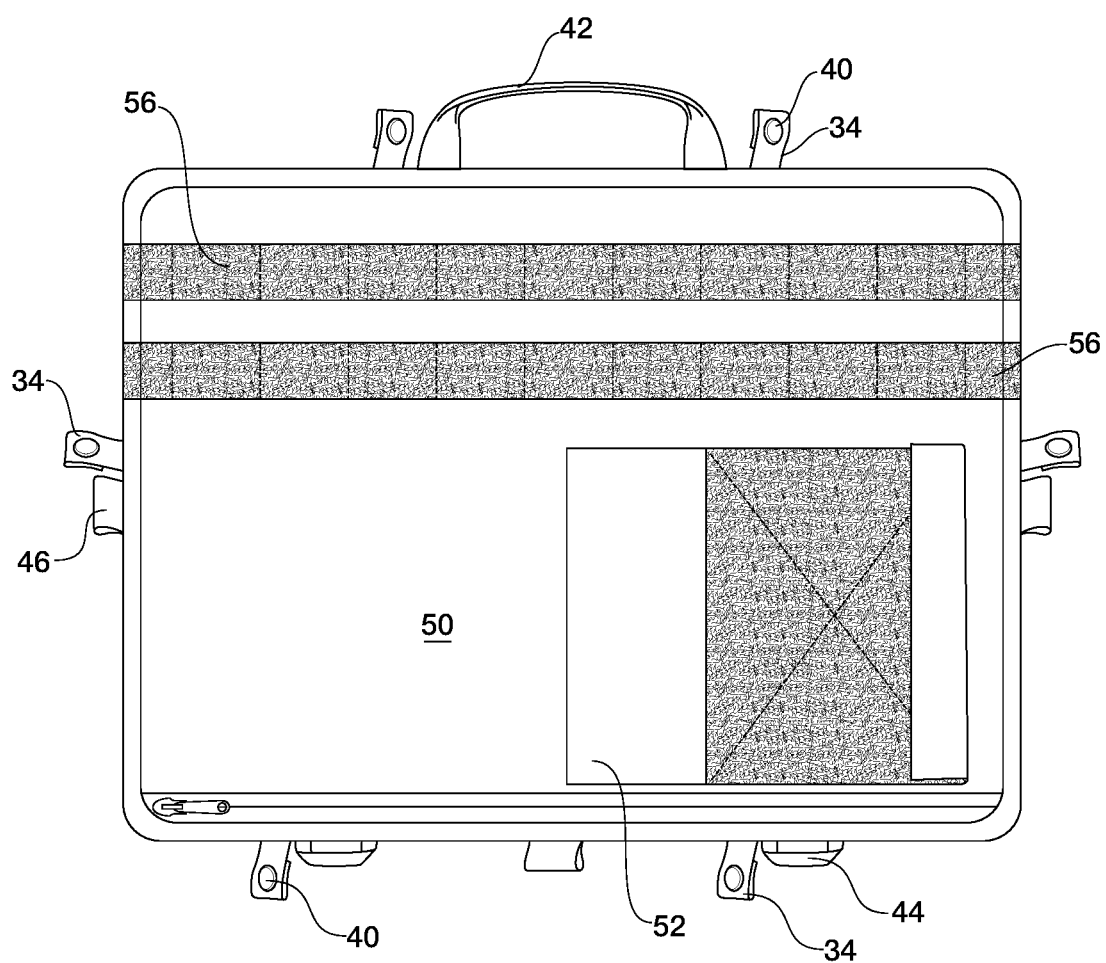
FIG. 2 is a bottom view of a backing board of the holder of FIG. 1.

As shown in FIG. 2, a lower surface 50 of the backing board 14 may be provided with one or more external storage pockets 52. The pockets 52 may be left open or may be closeable with various fasteners known in the art, including hook and loop fasteners or zipper fasteners. The pocket 52 may be useful for storing writing instruments, documents, and the like. In the illustrated embodiment, the lower surface 50 includes strips 56 sewn to the lower surface to integrate with the military's Modular Lightweight Load-carrying Equipment program or MOLLE. These strips may provide slots to receive straps and allow the holder 10 to be mounted to external objects such as a soldier's additional gear or to portions of a vehicle.

Figure 3:
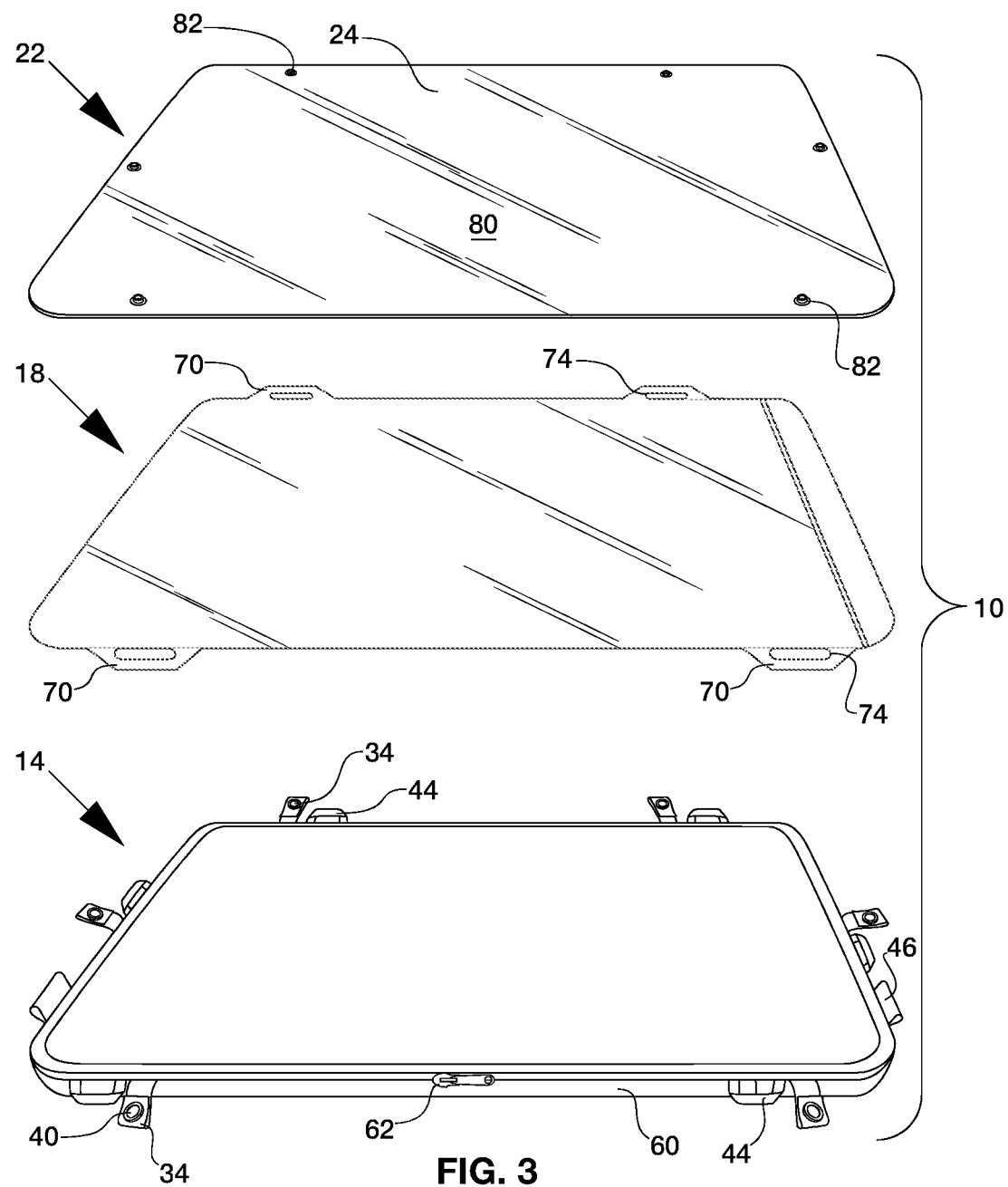
FIG. 3 is an exploded perspective view of a holder according to a second embodiment of the present disclosure.
Figure 4:
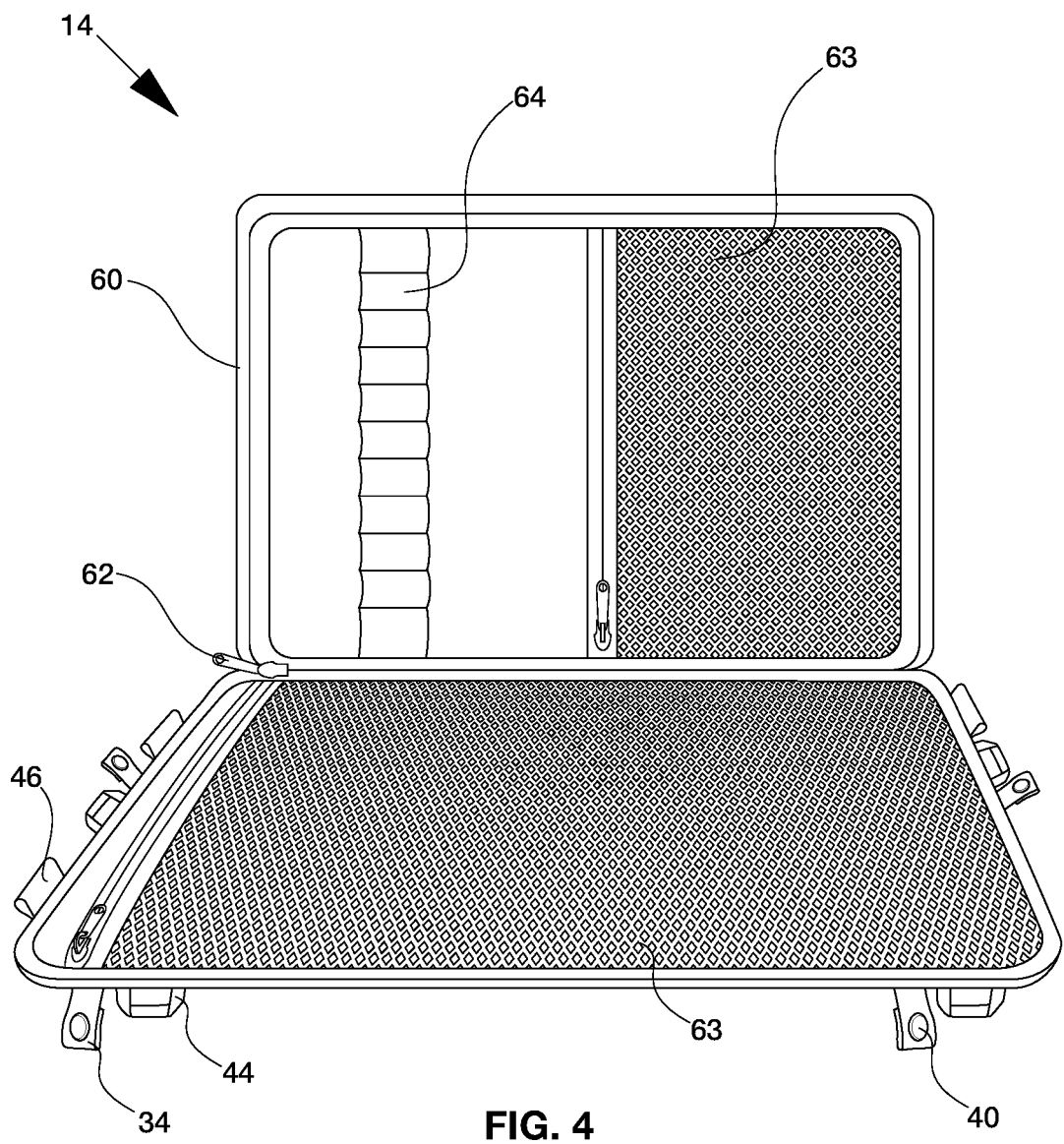
FIG. 4 is a perspective view showing the backing board of the embodiment of FIG. 3 in an open position.

A holder 10 with a second embodiment of the backing board 14 is shown in FIG. 3. The backing board 14 of the second embodiment is formed as a portfolio 60. The portfolio 60 may be closeable with a zipper fastener 62 or other closure means known in the art. The portfolio 60 may be configured to partially or fully open as shown in FIG. 4. The portfolio 60 may fold open to reveal internal storage compartments 63, writing instrument receivers 64, document file pockets, and/or an overlay sheet to protect papers.

In FIGS. 1 and 3, the pouch 18 is shown without printed media inside. The pouch 18 may be constructed from a strong, flexible, and transparent material, such as PEVA. The pouch 18 should be configured to be waterproof with the use of a resealable closure 66 along one side of the pouch. The resealable closure 66 may be of the press-close type most commonly associated with the Ziploc® brand. The pouch 18 may also include tabs 70, e.g. tie-down points, spaced along opposite side edges of the pouch. Apertures 74 passing through the respective tabs 70 may be configured to receive the straps 34 of the backing board 14. Similarly, the tabs 70 can be positioned with respect to the pouch 18 to correspond in location to at least one of the straps 34 around the upper surface 36 of the backing board 14 to align the pouch with the upper surface. Using multiple points of retention is preferred to minimize movement of the pouch 18 relative to the backing board 14 when the two are attached together.

Figure 5:
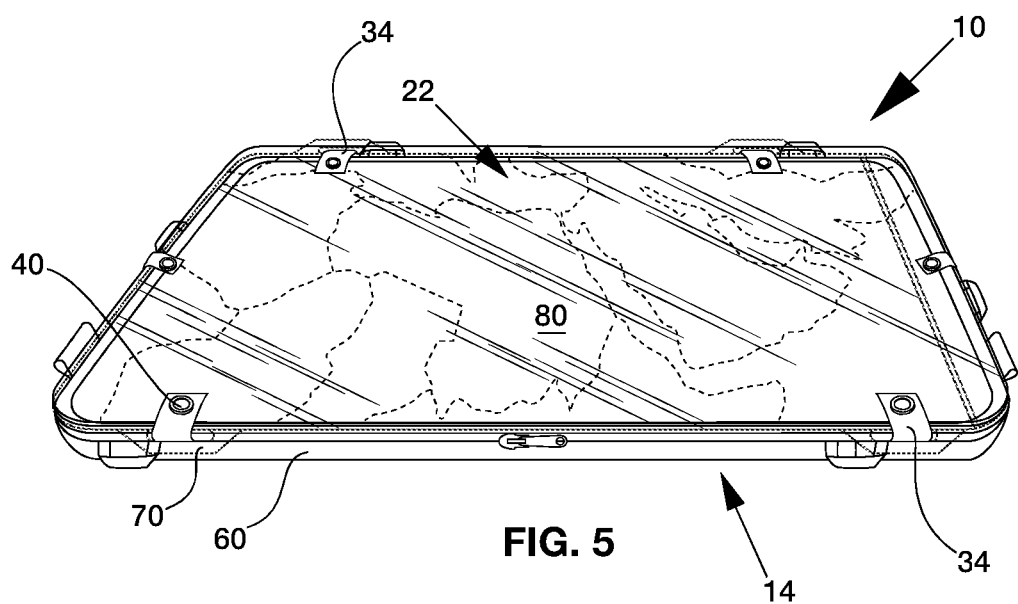
FIG. 5 is a top perspective view of the assembled holder of FIG. 3.

FIGS. 1 and 3 also show the cover plate 22. The cover plate 22 may be constructed from substantially rigid, transparent material. A suitable material may be polycarbonate. In a preferred embodiment, the cover plate 22 may be formed from abrasion resistant polycarbonate. The top surface 24 of the cover plate 22 provides a rigid, non-porous, transparent writing surface 80 to protect printed media and the pouch 18 from permanent marks left by writing instruments. In the illustrated embodiment, snap fastener studs 82 are integrated into the writing surface 80. The straps 34 of the backing board 14 mate with the snap fastener studs 82 to secure the cover plate 22 to the backing board 14 and sandwich the pouch 18 therebetween as shown in FIG. 5. In other embodiments, the cover plate 22 may be provided with other fastener portions from snap fasteners or hook and loop fasteners depending upon the structure of the straps 34. In yet another embodiment, the cover plate 22 may include tabs with apertures much like the pouch 18 such that the straps 34 fasten the cover plate to the backing board 14 by doubling back into engagement with the backing board after passing through the apertures of the respective tabs in the cover plate and the pouch.

Figure 6:
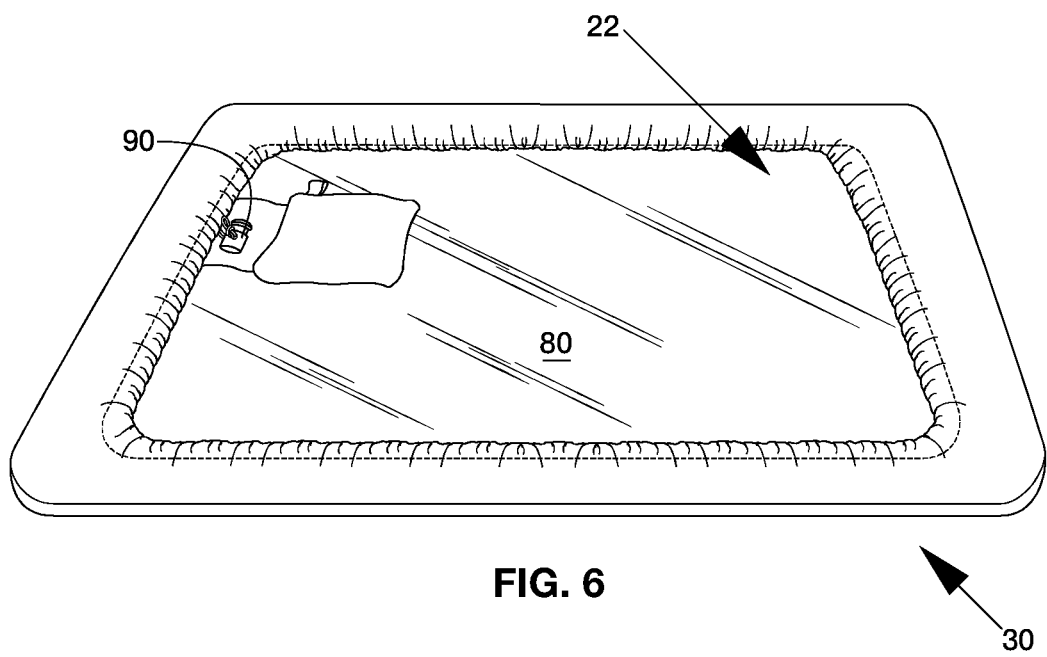
FIG. 6 is a top perspective view of the holder of FIG. 5 stored within an optional rain cover.

FIG. 1 shows an optional rain cover 30. The rain cover 30 may be nylon, such as 200 denier. An elastic drawstring 90 may be provided to pull the rain cover tight over the holder 10 and configured to at least partially surround the backing board 14, pouch 18, and cover plate 22. FIG. 6 shows the holder 10 positioned within the rain cover 30. Without printed media or equipment stored in the holder 10, the holder may weigh less than about four pounds, preferably less than about 3 pounds and most preferably less than about two pounds, depending upon the size of the holder. Suitable holders 10 may have approximate empty dimensions of about 12"×16"×0.5", 10"×12"×0.5", 16"×24"×0.5", or other suitable dimensions that are reasonably portable.

Figure 7:
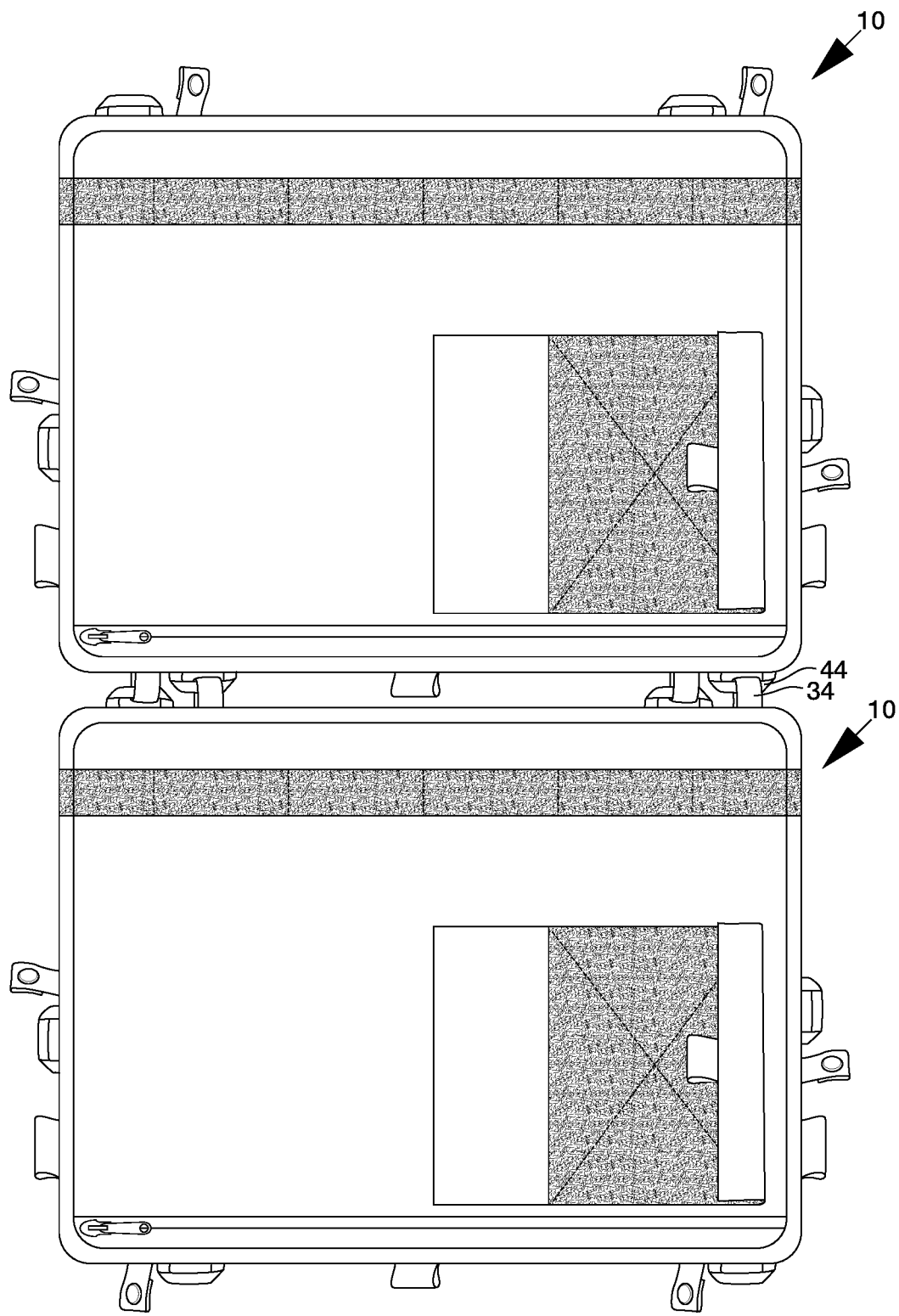
FIG. 7 illustrates a method of coupling a pair of holders of FIG. 2.

FIG. 7 illustrates how two holders 10 could interlock using the textile loops 44 and straps 34 along the periphery of the backing boards 14. The strap 34 from each backing board 14 could fit through the textile loop 44 on the opposing backing board 14 and then back to the cover plate 22 of the respective holder 10. Attaching two adjacent holders 10 along one edge thereof is configured to allow the holders to fold together like a book with their respective writing surfaces 80 facing one another or with their respective lower surfaces 50 facing one another. The straps 34 and textile loops 44 along a second edge of each holder 10 may be further mated together to hold the two holders 10 securely together in a stacked configuration.

Figure 8:
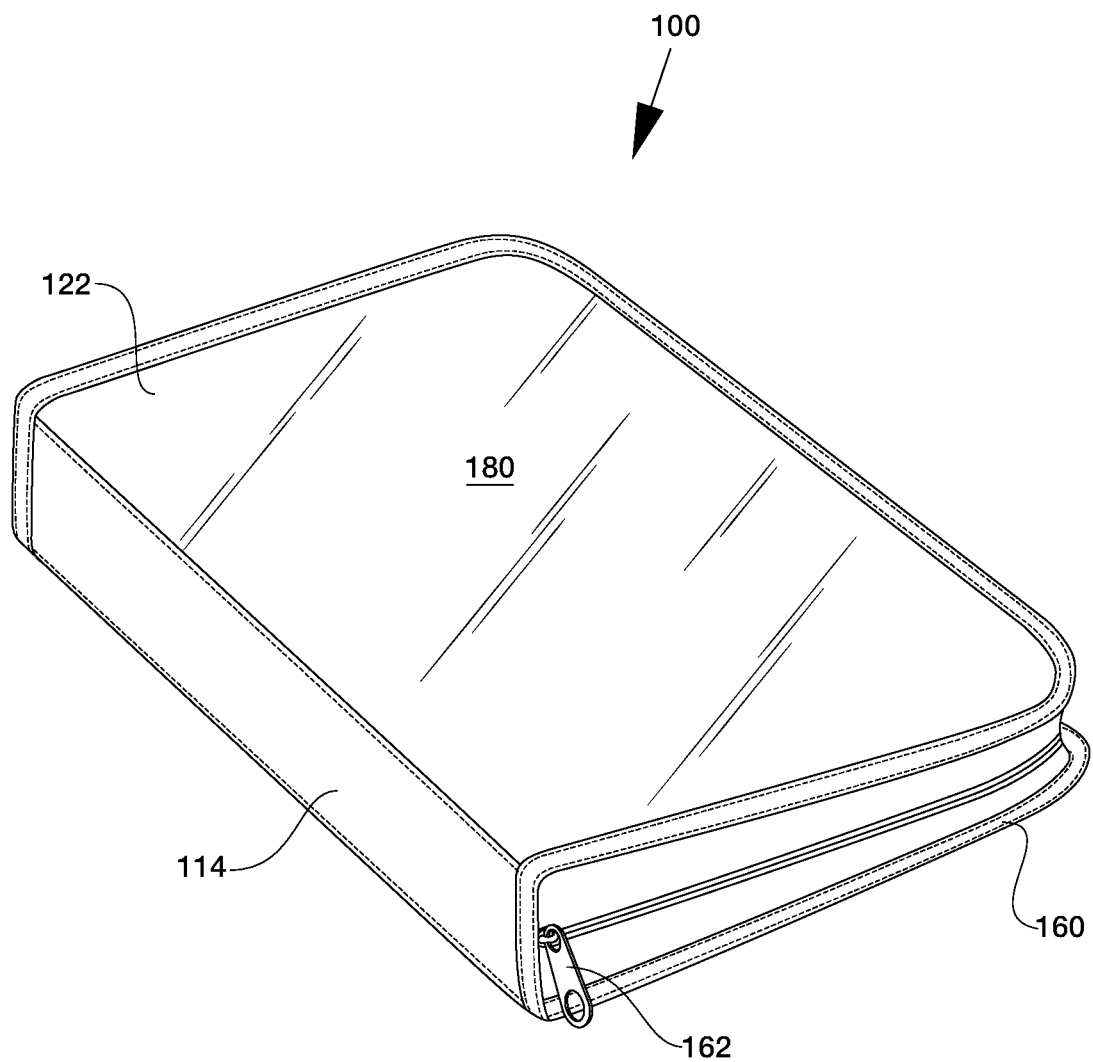
FIG. 8 is a front perspective of a holder according to a third embodiment of the present disclosure.
Figure 9:
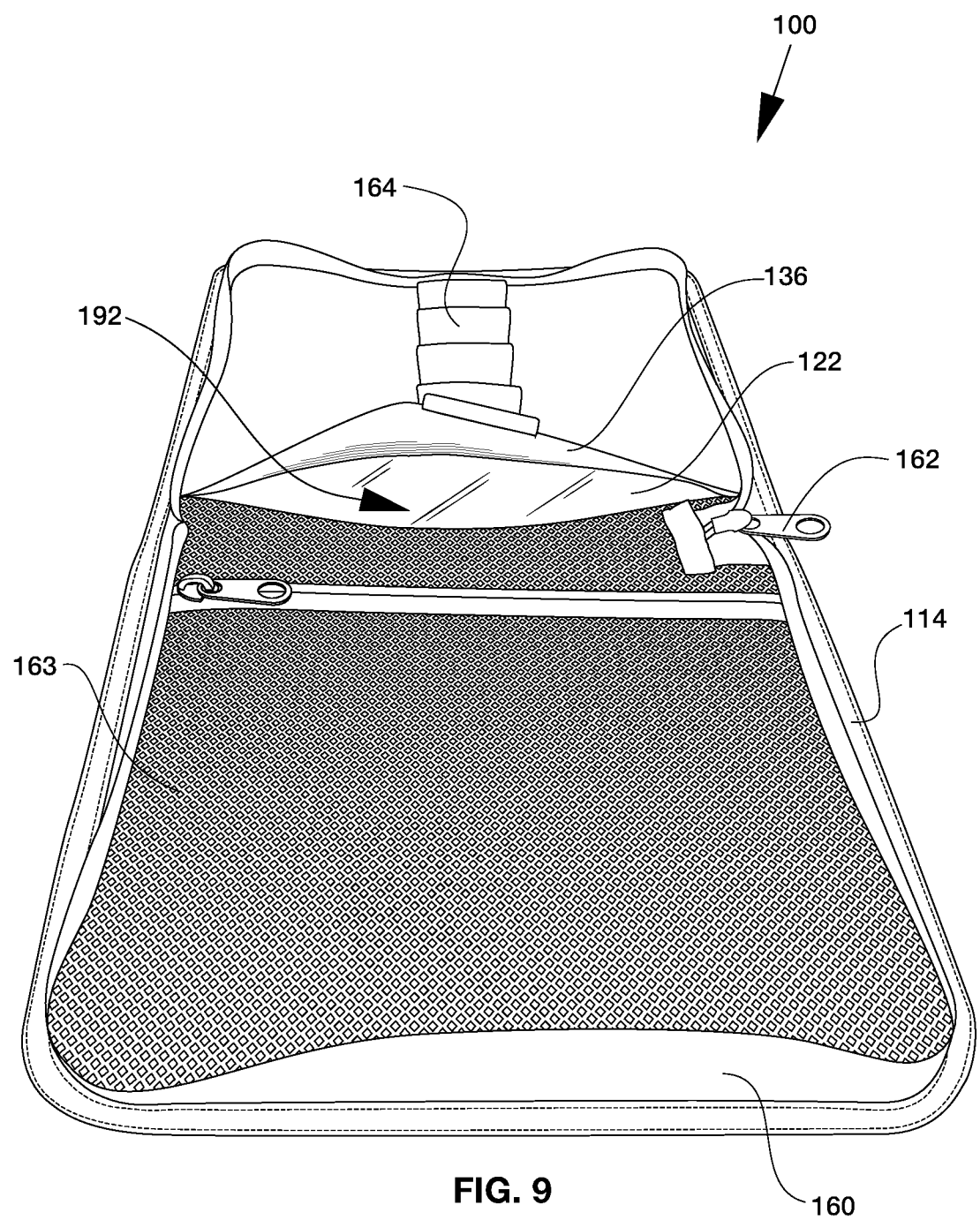
FIG. 9 is an interior view of the holder of FIG. 8.

FIGS. 8 and 9 illustrate a holder 100 according to another embodiment of the present disclosure. The holder 100 may include a backing board 114 in the form of a portfolio 160 that is closable with a zipper fastener 162. A bottom surface of the holder 100 may optionally include pockets, compartments or MOLLE strips similar to the bottom surface 50 of the holder 10 illustrated in FIG. 2. The backing board 114 may also include textile loops and writing utensil retainers as discussed above with respect to the first backing board 14. A cover plate 122 may be permanently sewn or otherwise attached to the upper surface of the backing board 114. Preferably, the cover plate 122 is sewn to the supper surface along three sides thereof. The cover plate 122 is substantially transparent and made from a material that is sufficiently rigid to create a suitable writing surface 180. In one embodiment, the cover plate 22 of FIG. 1 is a rigid polycarbonate sheet approximately 1/16" thick, while the cover plate 122 of FIGS. 8 and 9 is a more flexible, thinner sheet of polycarbonate or other durable polymer material.

FIG. 9 shows the backing board 114 when open, illustrating the access for printed media between the cover plate 122 and the upper surface 136 through an opening 192. The opening 192 may be created by an edge of the cover plate 122 that is not sewn to the upper surface 136. In the illustrated embodiment, the fabric layer forming the upper surface 136 is shown pulled away from the cover plate 122 to emphasize the opening 122. One of ordinary skill in the art will appreciate that the edges of the opening 122 will approach one another when the backing board 114 is closed. By accessing the opening 192 from the interior of the backing board 114, the printed media can be more protected from the elements, such as rain, after the backing board is closed. In one embodiment a closure fastener, such as a resealable closure or zipper closure may be added to close the opening 192. Like the portfolio 60 in FIG. 4, the backing board 114 may be provided with internal storage compartments 163 and writing instruments holders 164.

The embodiments of the present disclosure are particularly well-suited for outdoor activities which require the use of maps or other documents such as notes, codes, call signs, and checklists. For example, the holders 10, 100 of the present disclosure would be particularly well suited for military exercises in which maps are used for navigational purposes and data gathered during the exercise needs to be recorded over a pertinent portion of the map. For example, the present locations of troops or mobile equipment could be recorded on the writing surface 80 of the cover plate 22.

An advantage of the holders 10, 100 of the present disclosure is that the printed media can be quickly repositioned or replaced, either by unfastening some of the straps 34 around the perimeter of the holder or simply accessing the display pocket from within the holder 100. In the case of the holder 10, the straps 34 take only seconds to recompress the new map or document.

In another advantage, the fabric backing board 14, 114 can be placed on the ground or other support while the holder is or is not in use. The fabric backing board 14, 114 helps to avoid scratches and scrapes that may occur if the printed media were presented between a pair of rigid transparent layers.

Another advantage of some embodiments of the present disclosure is the ability to co-locate essential gear and equipment with the displayed printed media in the internal storage compartments 63, 163 and external storage pockets 52 of the backing board 14, 114. Similarly the optional MOLLE compatible strips 56 facilitate mounting of the holders 10 at various advantageous locations.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains. For example, the backing board 14, pouch 18 and cover plate 22 of the holders 10 described herein may function individually or in various other combinations of the components.

The invention claimed is:

1. A holder for displaying printed media, the holder comprising:
 a rigid, transparent, non-porous cover plate; and
 a fabric-covered backing board, the backing board having a planar surface for supporting the cover plate, and a plurality of straps located along a periphery of the planar surface;
 wherein the cover plate comprises fastener portions that are fixed to an exterior planar surface of the cover plate adjacent the peripheral edge thereof, the fastener portions selected from the group comprising a plurality of snap fastener studs, a plurality of snap fastener sockets, a plurality of loop fastener portions, or a plurality of hook fastener portions, the straps of the backing board configured to extend towards the cover plate and around the peripheral edge of the cover plate and secure to the fastener portions such that an end of the straps are planar parallel to the cover plate to secure the cover plate to the backing board, the cover plate and the backing board configured to secure printed media therebetween.

2. The holder of claim 1, wherein the straps each comprise a mating fastener portion selected from the group comprising a snap fastener socket, a snap fastener stud, a hook fastener portion, and a loop fastener portion, such that the straps are configured to attach to the fastener portions of the cover plate.

3. The holder of claim 1, wherein the backing board comprises a portfolio having at least one internal storage compartment.

4. The holder of claim 1, wherein the backing board comprises at least one writing implement retainer positioned near the periphery.

5. The holder of claim 1, wherein the backing board comprises at least one external storage pocket on a lower surface thereof opposite the planar surface.

6. The holder of claim 5, wherein the lower surface further comprises MOLLE compatible strips suitable for attaching the backing board to vehicles or other surfaces.

7. The holder of claim 1, further comprising a fabric rain cover having an elastic drawstring and configured to at least partially surround the backing board and cover plate.

8. The holder of claim 1, further comprising a handle attached to the backing board.

9. The holder of claim 1, wherein the backing board further comprises a plurality of textile loops adjacent to the straps and provided adjacent to the periphery of the planar surface.

10. A kit, comprising:
 a first holder for displaying printed media according to claim 9; and a second holder for displaying printed media according to claim 9,
wherein the first holder is configured to be attached to the second holder by passing at least some of the straps of the first holder through at least some of the textile loops of the second holder.

11. A holder for displaying printed media, the holder comprising:
a rigid, transparent, non-porous cover plate;
a fabric-covered backing board, the backing board having a planar surface for supporting the cover plate, and a plurality of straps located along a periphery of the planar surface; and
a waterproof flexible pouch, the pouch having a resealable closure along at least a portion of at least one side of the pouch, the pouch further comprising tabs spaced along opposite side edges of the pouch, wherein each tab has an aperture,
wherein the cover plate comprises fastener portions selected from the group comprising a plurality of snap fastener studs, a plurality of snap fastener sockets, a plurality of loop fastener portions, or a plurality of hook fastener portions, such that the fastener portions are configured to mate with the straps of the backing board to secure the cover plate to the backing board,
wherein the pouch is configured to be positioned between the planar surface of the backing board and the cover plate,
wherein the plurality of straps of the backing board are configured to extend through the apertures in respective tabs of the pouch to align the pouch with the planar surface.

12. A holder for displaying printed media, the holder comprising:
a rigid, transparent, non-porous cover plate comprising a plurality of fastener portions;
a backing board, the backing board having a planar surface for supporting the cover plate, and a plurality of straps disposed along a periphery of the planar surface; and
at least one waterproof flexible pouch, the pouch having a resealable closure along at least a portion of at least one side of the pouch, the pouch further comprising tabs spaced along opposite side edges of the pouch, wherein each tab has an aperture,
wherein the pouch is configured to be positioned between the planar surface of the backing board and the cover plate,
wherein the plurality of straps of the backing board are configured to extend through the apertures in respective tabs of the pouch to align the pouch with the planar surface, and
wherein the straps are configured to secure the cover plate to the backing board with the fastener portions.

13. The holder of claim 12, wherein the backing board is fabric-covered.

14. The holder of claim 12, wherein the fastener portions of the cover plate are selected from the group comprising a plurality of snap fastener studs, a plurality of snap fastener sockets, a plurality of loop fastener regions, or a plurality of hook fastener regions, such that the fastener portions are configured to mate with the straps of the backing board.

15. The holder of claim 14, wherein the straps each comprise a mating fastener portion selected from the group comprising a snap fastener socket, a snap fastener stud, a hook fastener region, and a loop fastener region, such that the straps are configured to attach to the fastener portions of the cover plate.

16. The holder of claim 12, wherein the backing board is a portfolio having at least one internal storage compartment.

17. The holder of claim 16, wherein the portfolio is closable with a zipper fastener.

18. The holder of claim 12, wherein the backing board has at least one external storage pocket on a lower surface thereof opposite the planar surface.

19. The holder of claim 18, wherein the lower surface has MOLLE compatible strips suitable for attaching the backing board to vehicles or other surfaces.

20. The holder of claim 12, wherein the backing board has textile loops adjacent to the straps and provided adjacent to the periphery of the planar surface.

\* \* \* \* \*